United States Patent [19]

Goss

[11] Patent Number: 4,828,151
[45] Date of Patent: May 9, 1989

[54] BICYCLE MAP HOLDER

[76] Inventor: M. Edwin Goss, 13107 Golden Oak Dr., Laurel, Md. 20708

[21] Appl. No.: 97,755

[22] Filed: Sep. 17, 1987

[51] Int. Cl.$^4$ .............................................. B62T 7/06
[52] U.S. Cl. .............................. 224/30 A; 280/288.4; 224/277; 224/41
[58] Field of Search ..................... 224/30 R, 30 A, 31, 224/33 A, 35, 36, 39, 41, 276, 277, 32 R; 40/603, 604, 610, 612; 280/289 R

[56] References Cited

U.S. PATENT DOCUMENTS

| | | | |
|---|---|---|---|
| 436,403 | 9/1890 | Dabbs | 224/36 X |
| 2,321,192 | 6/1943 | Fisher | 224/36 |
| 2,576,111 | 11/1951 | Glenny et al. | 224/36 |
| 4,056,219 | 11/1977 | Hine, Jr. | 224/36 |
| 4,066,196 | 1/1978 | Jackson et al. | 224/30 A |
| 4,260,086 | 4/1981 | Hine, Jr. et al. | 224/36 |
| 4,315,583 | 2/1982 | Hine, Jr. | 224/41 |
| 4,542,839 | 9/1985 | Levine et al. | 224/36 |

FOREIGN PATENT DOCUMENTS

| | | | |
|---|---|---|---|
| 8500659 | 10/1986 | Netherlands | 224/30 A |
| 98822 | 10/1961 | Norway | 383/63 |
| 26397 | of 1897 | United Kingdom | 224/35 |

Primary Examiner—Ernest G. Cusick
Attorney, Agent, or Firm—Carl I. Brundidge

[57] ABSTRACT

Bicycle map holder apparatus for disposing maps or the like about a bicycle such that the map can be easily viewed by a bicycle rider while riding the bicycle. The bicycle map holder apparatus includes a transparent map pocket for enclosing an open map, a map pocket holder device having a "U" shaped member wherein the legs of the "U" shaped member are removably attached to opposite ends of the transparent map pocket thereby maintaining the transparent map pocket and the open map in an open, extended position and a bicycle attachment device for attaching the map pocket holder device to the bicycle in a position in front of the bicycle rider such that the open map can be easily viewed by the bicycle rider while riding the bicycle.

10 Claims, 1 Drawing Sheet

BICYCLE MAP HOLDER

BACKGROUND OF THE INVENTION

The invention concerns apparatus for disposing a map or the like about a bicycle such that the map can be easily viewed by a bicycle rider while riding the bicycle.

Bicycle riders while riding a bicycle for pleasure or as a race participant have a need for ready access to a map or written directions for viewing. Oftentimes, as in a bicycle road race, one's elapsed time is critical. Valuable time can be lost and an unsafe condition can be created when the rider must pull the map from a pocket or pouch and open the map for viewing. At best, this type of maneuver is awkward if not impossible to perform. Even further, the maneuver is unsafe to perform by either a race participant or a pleasure rider.

Various devices have been proposed for holding a map such that it can be easily viewed by the rider. However the devices suffer from various disadvantages, for example: U.S. Pat. No. 436,403 discloses a bicycle book holder having one continuous wire bent into a spring-clamp device for holding the book in a stable open position about the bicycle handlebars.

U.s. Pat. No. 2,634,527 discloses a vehicle article holder having a flat supporting body and a clamping stirrup which is bent into a loop to overlie the front portion of the supporting body. The clamping stirrup is provided with a presser foot which presses particles such as tourist maps or the like against the upper surface of the supporting body. The device disclosed by U.S. Pat. No. 2,634,527 is connected to the shank of the front fork of a bicycle by the screw which connects the handlebar with the shank.

U.S. Pat. No. 2,321,192 discloses a motorcycle pad holder having a rectangular shaped box with resilient clips on two sides of the box for holding maps or the like. The box has a compartment for holding pencils or other articles.

As indicated above, the above described devices suffer from various disadvantages, namely: the devices do not have an aerodynamic profile to reduce wind resistance; the devices do not provide apparatus for protecting the map against rain or the like; the devices, by using clamps to hold the maps in place, permit the maps to flop about in the wind; the devices are not easily attached and detached to and from the bicycle; the devices are not light in weight; and the devices do not provide apparatus for adjusting the viewing angle of the maps.

The present invention provides apparatus for disposing a map or the like about a bicycle which overcomes each of the above described disadvantages.

SUMMARY OF THE INVENTION

The present invention provides apparatus for disposing a map or the like about a bicycle such that the map can be easily viewed by a bicycle rider while riding the bicycle. The bicycle map holder apparatus includes a transparent map pocket means for enclosing an open map to protect the map from the rain or the like. The map pocket means has an opening, which may be reclosable, for inserting and removing maps.

A map pocket holder means is provided for holding the transparent map pocket means in a a stretched fully extended position. The map packet holder means includes a "U" shaped member whereby the legs of the "U" shaped member are removably attached to opposite ends of the transparent pocket, thereby holding the transparent map pocket means in a stretched fully extended position.

The bicycle map holder apparatus also includes a bicycle attachment means for attaching the map holder device to the bicycle in a position in front of the bicycle rider such that the map can be easily viewed by the bicycle rider.

BRIEF DESCRIPTION OF THE DRAWINGS

The above and still further features and advantages of the present invention will become more apparent upon consideration of the following detailed description of specific embodiments thereof, especially when considered in conjunction with the accompanying drawings wherein like parts of each of the several figures are identified by the same reference numerals, and wherein.

DETAILED DESCRIPTION OF THE DRAWINGS

The present invention provides a bicycle map holder for disposing maps or the like about a bicycle such that the map can be easily viewed by a bicycle rider while riding the bicycle.

Figure 1:
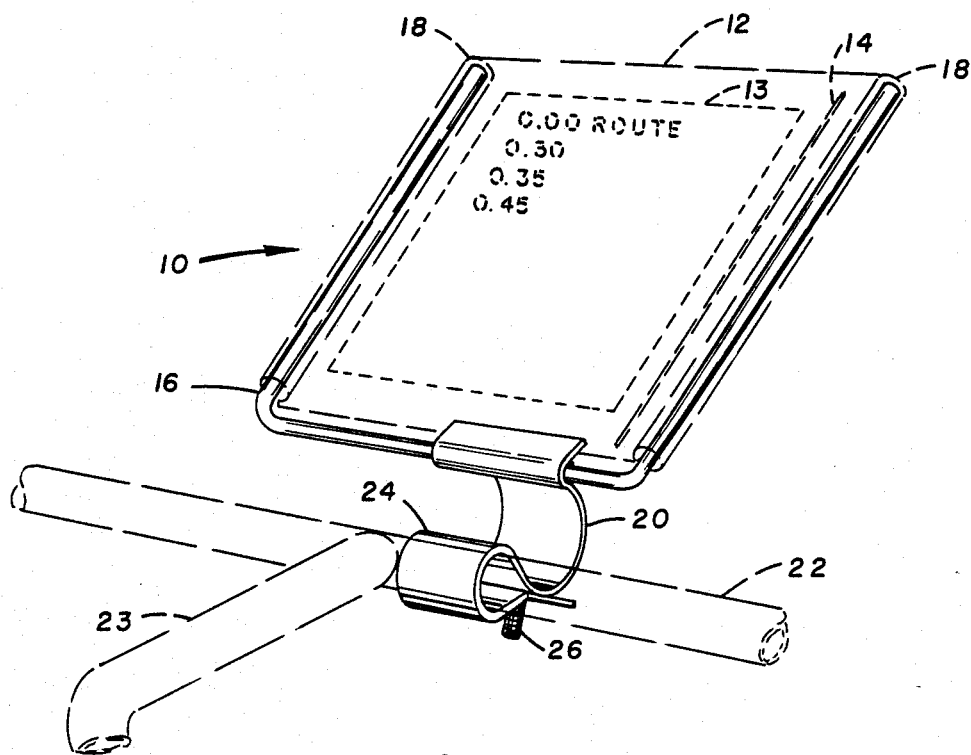
FIG. 1 shows a perspective view of the present invention removably attached to the handlebars of a bicycle.

The bicycle map holder 10 as shown in FIG. 1 includes a transparent map pocket means 12 being made of a clear, transparent moisture resistant material. The map pocket means 12 encloses a map 13 which has been opened to the area which displays the complete route to be taken by the bicycle rider. The complete route to be taken is shown through the sides of the map pocket 12. The map 13 can also be in the form of a list of directions from one location to another. The map pocket means 12 has an opening 14, which may be reclosable, for inserting and removing the map 13. The opening 14 may be in the form of a slit across one side of the map pocket means 12 or in the form of a reclosable opening which may be a zipper structure found in household plastic sandwich bags or a plastic zipper structure of the rib and groove bag closure type.

The map pocket means 12 provides protection for the map 13 from rain or the like and holds the map 13 open to the area of interest.

A map pocket holder means 16 is provided by the apparatus of the present invention for holding the map pocket means 12 in a position such that the map pocket means 12 is stretched fully extended by the map pocket holder means. The map pocket holder means 16 includes a "U" shaped member having two spaced apart legs and a cross bar integral with the two legs. The map pocket means 12 has loops 18 at both ends of the map pocket means 12. Each loop 18 is placed about a leg of the map pocket means holder means 16 such that the map pocket 12 is extended somewhat tight between the legs of the map pocket holder means 16.

The apparatus of the present invention also includes a bicycle attachment means 20. The bicycle attachment means 20 is attached to the map pocket holder means 16 and is designed to removably attach the map pocket holder means 16 including the map pocket means 12 to the bicycle. The bicycle attachment means 20 may specifically be attached to handlebars 22 of a bicycle as well as other parts of the bicycle. The handlebars 22 include a vertical center post 23 which is attached to the bicycle. The bicycle attachment device 20 is attached to the cross bar of the map pocket holder means 16 off to one side of the center point of the cross bar so as to permit the map 13 including the map pocket holder means 16 to be centered across the vertical center post 23 of the handlebars 22. Still further, the bicycle attachment means 20 is designed such that it can be reversibly mounted on the left or right side of the vertical center post 23. The bicycle attachment means does not interfere with the operation and placement of the brake cables nor the normal placement of the bicycle rider's hands during riding.

Figure 2:
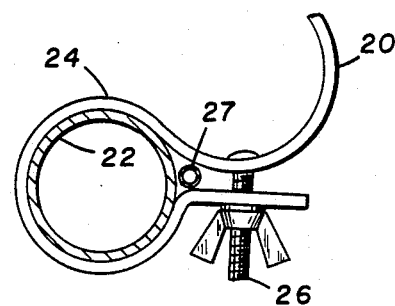
FIG. 2 shows a portion of the bicycle attachment device of the present invention.

The bicycle attachment means 20, as further shown in FIG. 2, includes a clamping mechanism 24 having a curved resilient portion which may be pressed onto the handlebars such that the resilient portion wraps around the circumference of the handlebars. The clamping mechanism 24 also includes a fastening device 26 which tightens or locks the curved resilient portion about the handlebars 22 leaving room for the bicycle brake cable 27. The fastening device 26 may be a wing nut and screw combination or any other fastener. The clamping mechanism 24 permits the rider to rotationally move the bicycle map holder apparatus 10 about the handlebars 22 until the desired viewing angle is selected. Once the viewing angle is selected, the apparatus can be locked in place by the fastening device 26.

The bicycle attachment means 20, when attached to the bicycle in front of the rider, centrally disposes the map in a stable open position across the center post 23 of the handlebars such that the map may be easily viewed by the bicycle rider.

The present invention provides a relatively light weight bicycle map holder apparatus which is easily attached to a bicycle. The top edge of the apparatus can be angled into the direction of travel thereby reducing wind resistance and providing an aerodynamic profile. In addition, the viewing angle may be selected and the map is held open and stable for complete viewing by the rider.

Having described a preferred embodiment of a bicycle map holder apparatus, it is believed that other modifications, variations and changes will be suggested to those skilled in the art in view of the teachings set forth herein. It is, therefore, to be understood that all such variations, modifications and changes are believed to fall within the scope of the present invention as defined by the appended claims.

What is claimed is:

1. Apparatus for disposing a map or the like about a bicycle such that the map can be easily viewed by a bicycle rider while riding the bicycle, said apparatus comprising:

transparent map pocket means for enclosing an open map such that the complete route to be taken by the bicycle rider is shown through the sides of said transparent map pocket means, wherein said transparent map pocket means includes an opening for inserting and removing a map;

map pocket holder means for holding said transparent map pocket means in a stretched fully extended position, wherein said map pocket holder means includes, a "U" shaped member having two spaced apart legs and a cross bar integral with and extending straight between said two legs wherein each leg may be removably connected to an end of said map pocket means thereby holding said map pocket means between said legs in a stretched fully extended position; and bicycle attachment means removably attached to the cross bar of said map pocket holder means for removably attaching said map pocket holder means to the bicycle in a position in front of the bicycle rider such that the map can be easily viewed by the bicycle rider while riding the bicycle.

2. Apparatus according to claim 1 wherein each end of said map pocket means comprises:

a loop of material for being removably placed about a leg of said "U" shaped member.

3. Apparatus according to claim 2, wherein said bicycle attachment means comprises:

a clamping means for clamping said apparatus to said bicycle; wherein said clamping means includes a curved resilient portion which may be operatively wrapped for releasable engagement around a portion of said bicycle and fastening means for fastening said curved resilient portion around said portion of said bicycle centrally disposing said map across the front of said bicycle.

4. Apparatus according to claim 3 wherein said bicycle attachment means is attached to the cross bar of said "U" shaped member off to one side of the center of said cross bar thereby permitting the map to be centered across the front of said bicycle.

5. Apparatus according to claim 4 wherein said bicycle attachment means is configured such that said bicycle attachment means can be reversibly mounted oon said bicycle.

6. Apparatus for disposing a map or the like about a bicycle such that the map can be easily viewed by a bicycle rider while riding the bicycle, said apparatus comprising:

map pocket means for enclosing an open map such that the complete route to be taken by the bicycle rider is shown through the sides of said map pocket means, wherein said map pocket means includes an opening for inserting and removing a map;

map pocket holder means for holding said map pocket means in a stretched fully extended position, wherein said map pocket holder means includes, a "U" shaped member having two spaced apart legs and a cross bar integral with and extending straight between said two legs wherein each leg may be removably connected to an end of said map pocket means thereby holding said map pocket means between said legs in a stretched fully extended position; and bicycle attachment means removably attached to the cross bar of said map pocket holder means for removably attaching said map pocket holder means to the bicycle in a position in front of the bicycle rider such that the map can be easily viewed by the bicycle rider while riding the bicycle.

7. Apparatus according to claim 6 wherein each of said map pocket means comprises:

a loop of material for being removably placed about a leg of said "U" shaped member.

8. Apparatus according to claim 7 wherein said bicycle attachment means comprises:

a clamping means for clamping said apparatus to said bicycle; wherein said clamping means includes a curved resilient portion which may be operatively wrapped for releasable engagement around a portion of said bicycle and fastening means for fastening said curved resilient portion around said portion of said bicycle centrally disposing said map across the front of said bicycle.

9. Apparatus according to claim 8 wherein said bicycle attachment means is attached to cross bar of said "U" shaped member off to one side of the center of said cross bar thereby permitting the map to be centered across the front of said bicycle.

10. Apparatus according to claim 9 wherein said bicycle attachment means is configured such that said bicycle attachment means can be reversibly mounted on said bicycle.

* * * * *